US012217923B2

(12) United States Patent
Reese et al.

(10) Patent No.: US 12,217,923 B2
(45) Date of Patent: *Feb. 4, 2025

(54) MULTI-MODE AIR COMPRESSOR PRESSURE POWER SWITCH

(71) Applicant: TRANSFORM SR BRANDS LLC, Hoffman Estates, IL (US)

(72) Inventors: Brian Todd Reese, St. Charles, IL (US); Cody Lyle Mayer, Chicago, IL (US)

(73) Assignee: TRANSFORM SR BRANDS LLC, Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,158

(22) Filed: Nov. 2, 2023

(65) Prior Publication Data

US 2024/0062974 A1 Feb. 22, 2024

Related U.S. Application Data

(63) Continuation of application No. 16/725,311, filed on Dec. 23, 2019, now Pat. No. 11,842,867, which is a (Continued)

(51) Int. Cl.

*H01H 35/34* (2006.01)
*F04B 49/02* (2006.01)
*H01H 35/26* (2006.01)

(52) U.S. Cl.

CPC ........... *H01H 35/34* (2013.01); *F04B 49/022* (2013.01); *H01H 35/2607* (2013.01); *H01H 35/2614* (2013.01)

(58) Field of Classification Search

CPC ............... H01H 35/34; H01H 35/2614; H01H 35/2607; G05D 16/2066; F04B 49/022

See application file for complete search history.

(56) References Cited

U.S. PATENT DOCUMENTS 1,802,178 A 4/1931 Leonard
1,945,720 A * 2/1934 Apple .................... H01H 35/34
200/83 J (Continued)

FOREIGN PATENT DOCUMENTS

DE 19808559 C1 9/1999

OTHER PUBLICATIONS

Commercial Pressure and Flat Switches for Power Circuits, Catalog 9034CT9701R01/11, Class 9013, 9036, 9037, 9038, Pumptrol(TM), Schneider Electric (2011) (69 pages).

(Continued)

*Primary Examiner* — Nathan C Zollinger

(74) *Attorney, Agent, or Firm* — McAndrews, Held & Malloy, Ltd.

(57) ABSTRACT

A multi-mode air compressor pressure switch is disclosed. A first mode of operation of the switch has a first range that includes a first cut-out pressure and a first cut-in pressure. A second mode of operation of the switch has a second range that includes a second cut-out pressure and a second cut-in pressure. The second range is smaller than the first range. The second mode of operation adds compressor output over the first mode of operation to extend operable time of a tool that is connected to a compressor that is controlled by the first mode and the second mode.

20 Claims, 8 Drawing Sheets

Related U.S. Application Data continuation of application No. 15/041,434, filed on Feb. 11, 2016, now Pat. No. 10,529,512.

(56) References Cited

U.S. PATENT DOCUMENTS

| | | | | | |
|---|---|---|---|---|---|
| 2,193,127 | A | | 3/1940 | Furnas | |
| 3,089,008 | A | | 5/1963 | Shirey | |
| 3,495,767 | A | | 2/1970 | Zrostlik | |
| 3,875,358 | A | | 4/1975 | Wildox | |
| 4,052,574 | A | * | 10/1977 | Brown | H01H 35/2607<br>200/83 SA |
| 4,201,517 | A | * | 5/1980 | Ferguson | G05D 16/208<br>417/12 |
| 4,868,356 | A | | 9/1989 | Lindsey | |
| 5,046,928 | A | | 9/1991 | Peterson | |
| 5,530,215 | A | | 6/1996 | Courvreur | |
| 7,000,481 | B2 | * | 2/2006 | Mo | H01H 35/265<br>73/716 |
| 10,529,512 | B2 | * | 1/2020 | Reese | H01H 35/34 |
| 11,842,867 | B2 | * | 12/2023 | Reese | F04B 49/022 |
| 2005/0031458 | A1 | * | 2/2005 | Brashears | B25H 3/006<br>417/313 |
| 2005/0126298 | A1 | | 6/2005 | Mo | |
| 2024/0021385 | A1 | * | 1/2024 | Kumar | H01H 9/167 |

OTHER PUBLICATIONS

Telemecanique, Sensors, Electronic Pressure Switches, pp. 22-29 to 22-28, www.schneider-electric.us, Schneider Electric (2012) (20 pages).

Electric Trading Co., Switches for Pressure Vacuum & Pumps, http://vps2765.inmotionhosting.com/~blower5/originalblowerwheel.com/switches-pump.htm; printed May 9, 2016 (5 pages).

Type F-Pumptrol(TM) Water Pump Pressure Switches, Class 9013, Refer to Catalog 9013CT9701; http://www.productinfo.schneider-electric.com/portals/ui/digest/viewer/561d5d65e4b0c5c41a243bf2/561d5f9ae4b0c5c41a244844/r/_17722021_85944; printed May 9, 2016 (6 pages).

Commercial Pressure Switches, Type F-Pumptrol(TM) Water Pump Pressure Switches, Class 9013, Refer to Catalog 9013CT9701; Square D by Schneider Electric, www.schneider-electric.us; pp. 22-19, 22-23, 22-14 (2009) (3 pages).

* cited by examiner

MULTI-MODE AIR COMPRESSOR PRESSURE POWER SWITCH

CROSS REFERENCE TO RELATED APPLICATIONS

The present application is a continuation of U.S. application Ser. No. 16/725,311, filed Dec. 23, 2019, which is a continuation of U.S. application Ser. No. 15/041,434, filed Feb. 11, 2016 (U.S. Pat. No. 10,529,512). The above-identified application is hereby incorporated herein by reference in its entirety.

BACKGROUND

Air tools have varying compressed air consumption rates. Air compressors are provided with various outputs. Most retail format air compressors have a capacity and output that are too small to run continuous duty operation air tools such as, for example, grinders, sanders, cutters, polishers, and drills.

What is needed are systems and methods that provide additional compressor output to existing tank capacity to extend the time that an air tool can operate before reaching an air pressure that is too low to operate the air tool.

BRIEF SUMMARY

Systems and methods provide a multi-mode air compressor switch that adds compressor output to existing tank capacity to extend the operational time range of an air tool substantially as illustrated by and/or described in connection with at least one of the figures, as set forth more completely in the claims.

DETAILED DESCRIPTION OF THE INVENTION

Figure 1B:
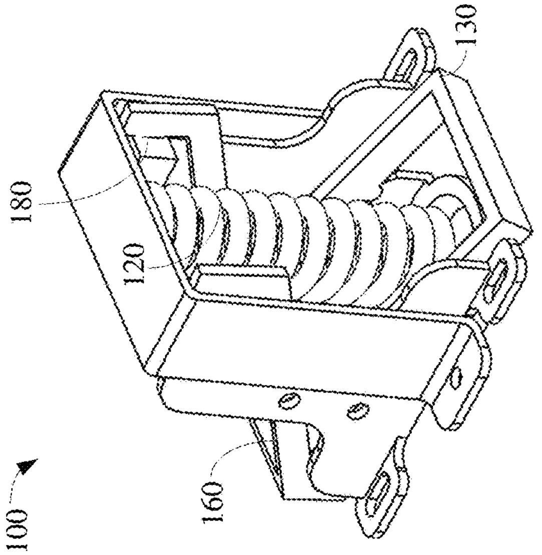
FIG. 1B shows a first perspective view of the switch assembly shown in FIG. 1A.

Some embodiments according to the present disclosure provide systems and methods that provide a multi-mode air compressor pressure switch that adds compressor output to existing tank capacity to extend the time that an air tool can operate before reaching an air pressure that is too low to operate the air tool.

Some embodiments according to the present disclosure enable an air compressor to cut-in, for example, immediately after initiating use to provide the additional compressor output to existing tank capacity to extend the operational time range of the air tool (e.g., grinders, sanders, cutters, polishers, drills, etc.).

Some embodiments according to the present disclosure provide a dual mode pressure based switch that can be used with air compressors or water pumps or any system that creates a reserve resource.

Some embodiments according to the present disclosure enable an operator (e.g., a user) or a circuit to toggle easily and quickly between a first mode and a second mode, where the first mode is a normal differential cut-in mode and the second mode is a fast (e.g., minimal differential) cut-in mode.

Some embodiments according to the present disclosure provide structure and/or operation that support a dual mode feature that enables the functional run time to be extended when tools are used that exceed the maximum output flow rate of the air compressor. As a quick and simple compressor control mode setting, operators can take advantage of an extended use time when needed or desired, or use a standard operating mode when the extended use time is not needed or desired.

Some embodiments according to the present disclosure provide a pressure-based power/control switch arrangement that is configured for use with air compressors (e.g., non-industrial format air compressors). The switch arrangement has at least two functions. First, it operates as an on/off switch for the air compressor. Second, it regulates tank pressure by turning the air compressor on (e.g., at cut-in) to increase tank pressure and shuts the air compressor off (e.g., at cut-out) when a maximum tank pressure is reached. In a first mode, a cut-in pressure is set to approximately 10-30% under maximum pressure to prevent excessive compressor cycling on/off or to prevent the continuous running of the air compressor during non-use periods resulting from loss of tank pressure due to small system leaks and coupling leaks, for example. The lower cut-in pressure allows an air tool to consume tank pressure capacitance for a period of use time prior to compressor cycling. In a second mode, the approximately 10-30% drop to cut-in pressure is easily and quickly overridden, and the air compressor is forced to cut-in, for example, nearly immediately after initiating air tool use or compressed air consumption. The second mode extends run time at the highest possible air pressure during high consumption rate use of compressed air.

Some embodiments according to the present disclosure provide the added compressor output to existing tank capacity by using one or more of the following: "snap action" style switches/lever mechanism; multiple switches; and electronic controls.

FIGS. 1-4 show an embodiment of a snap action style switch assembly 100 that provides for a standard mode of operation and a quick charge mode of operation according to the present disclosure.

Figure 1C:
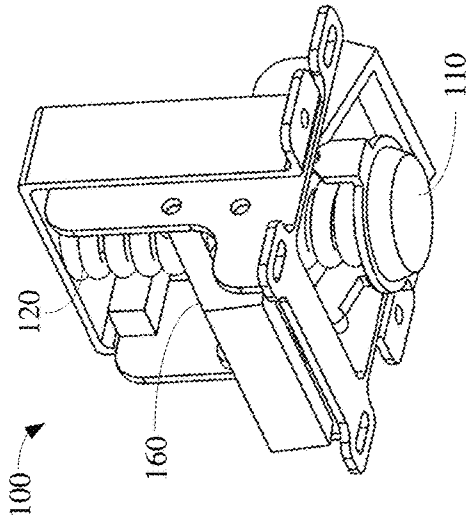
FIG. 1C shows a second perspective view of the switch assembly shown in FIG. 1A.
Figure 1A:
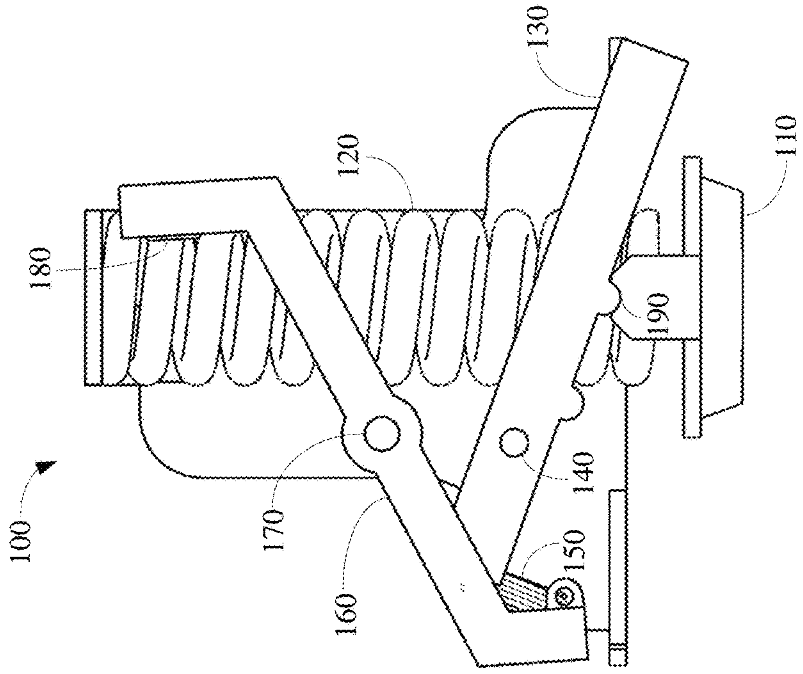
FIG. 1A shows an embodiment of a switch assembly in a standard mode when the air compressor is on according to the present disclosure.

FIGS. 1-2 show an embodiment of a configuration of the switch assembly 100 for use during the standard mode of operation. Referring to FIGS. 1A-C, the switch assembly 100 includes, for example, a diaphragm connector 110, a compression spring 120, a first lever 130, a first pivot 140, a torsion spring 150, a second lever 160, a second pivot 170, a switch contact 180, and a standard pivot point 190. The compression spring 120 is arranged to oppose the movement of the diaphragm connector 110 which sits on and is acted upon by the diaphragm (now shown). The first lever 130 is arranged to pivot around the first pivot point 140 and is connected to the second lever 160 through a torsion spring 150. The second lever 160 is arranged to pivot around the second pivot point 170 and is connected to the switch contact 180.

In standard mode when the air compressor is on as in FIGS. 1A-C, the tank air pressure increases when the tank pressure is less than the cut-out pressure (e.g., 150 psi) and works on the diaphragm connector 110, which sits on and is acted upon by the diaphragm (now shown), to overcome an opposing compression spring 120 and move the first lever 130. The first lever 130 works through the first pivot 140 onto the torsion spring 150 that is connected to a second lever 160 in an "over-center" or snap action format. The second lever 160 is also on the second pivot 170 and provides the switch contact 180 at its opposite end. When the second lever 160 is in a first "snapped" position as shown in FIGS. 1A-C, it causes continuity between the two switch contacts 180 and causes the air compressor to be on.

Figure 2B:
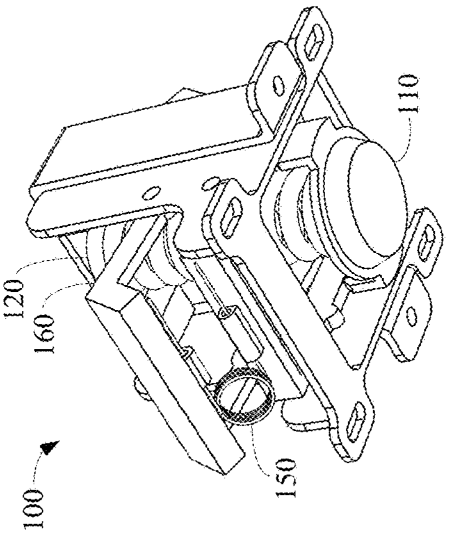
FIG. 2B shows a first perspective view of the switch assembly shown in FIG. 2A.
Figure 2C:
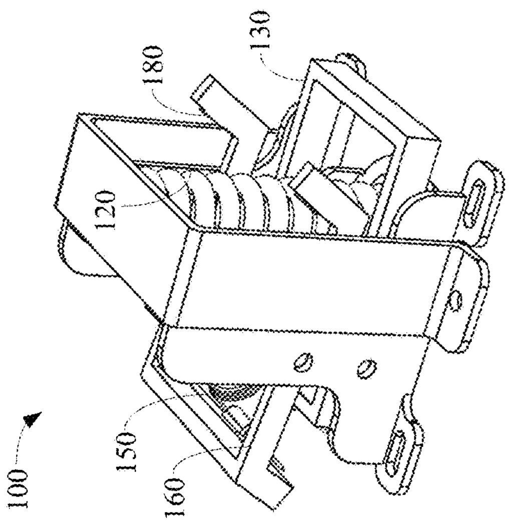
FIG. 2C shows a second perspective view of the switch assembly shown in FIG. 2A.
Figure 2A:
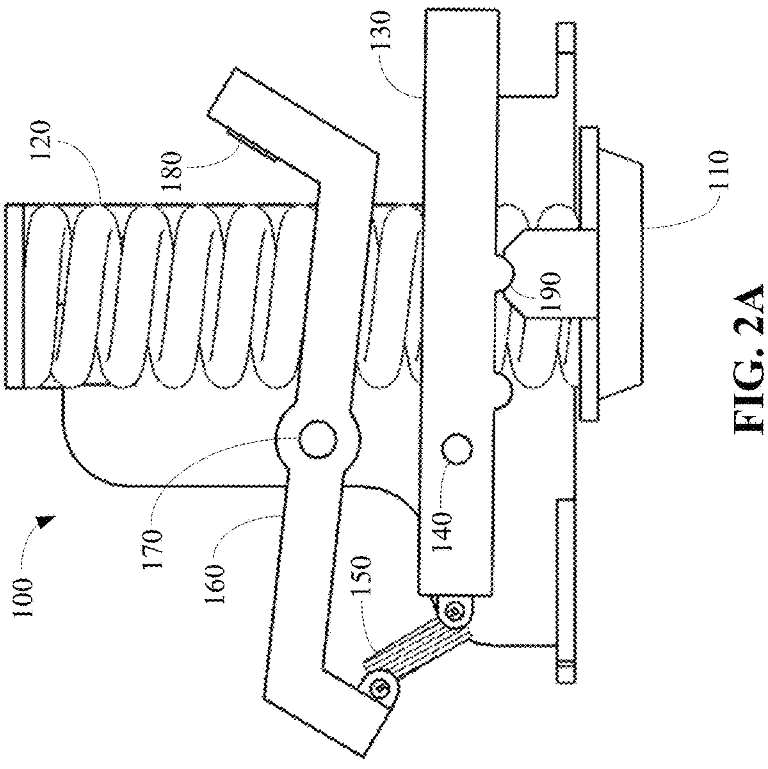
FIG. 2A shows an embodiment of the switch assembly in a standard mode when the air compressor is off according to the present disclosure.

FIGS. 2A-C show that, in standard mode, having reached the cut-out pressure and turned off, the compressor remains off until the tank pressure is less than or equal to the cut-in pressure (e.g., 135 psi). Until the tank pressure is less than or equal to the cut-in pressure, the diaphragm connector 110, which sits on and is acted upon by the diaphragm (now shown), works on the first lever 130 to cause the second lever 160 to snap into a second snapped position. When the second lever 160 is in a second snapped position as shown in FIGS. 2A-C, it causes the switch contacts 180 to be open and causes the air compressor to turn off.

In some embodiments, the switch assembly 100 allows preload adjustment to the spring 120 opposing the tank pressure which adjusts cut-out pressure. Some embodiments also allow adjustment to the stop location of the second lever 160 which modulates the range between cut-in and cut-out; however, due to the over-center design, this range cannot physically be adjusted close enough for use in a quick charge mode. In standard mode, using the configuration shown in FIGS. 1-2, some embodiments have a cut-out pressure of 150 psi and a cut-in pressure of 135 psi. Typically, the range cannot get smaller than approximately 12 psi for the configuration used in standard mode as shown in FIGS. 1-2.

Figure 3B:
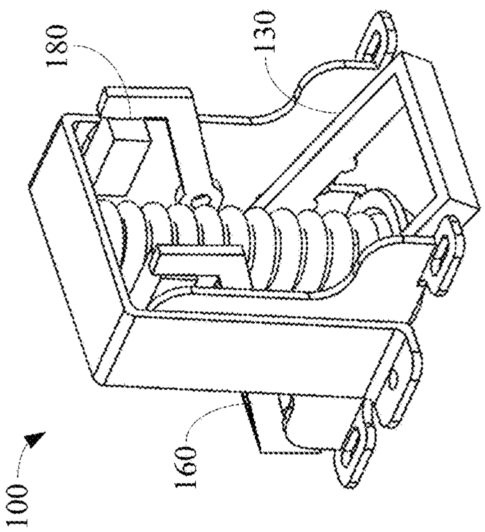
FIG. 3B shows a first perspective view of the switch assembly shown in FIG. 3A.
Figure 3C:
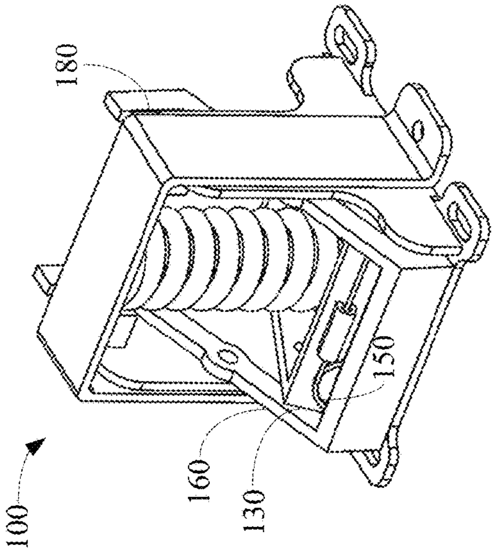
FIG. 3C shows a second perspective view of the switch assembly shown in FIG. 3A.
Figure 3A:
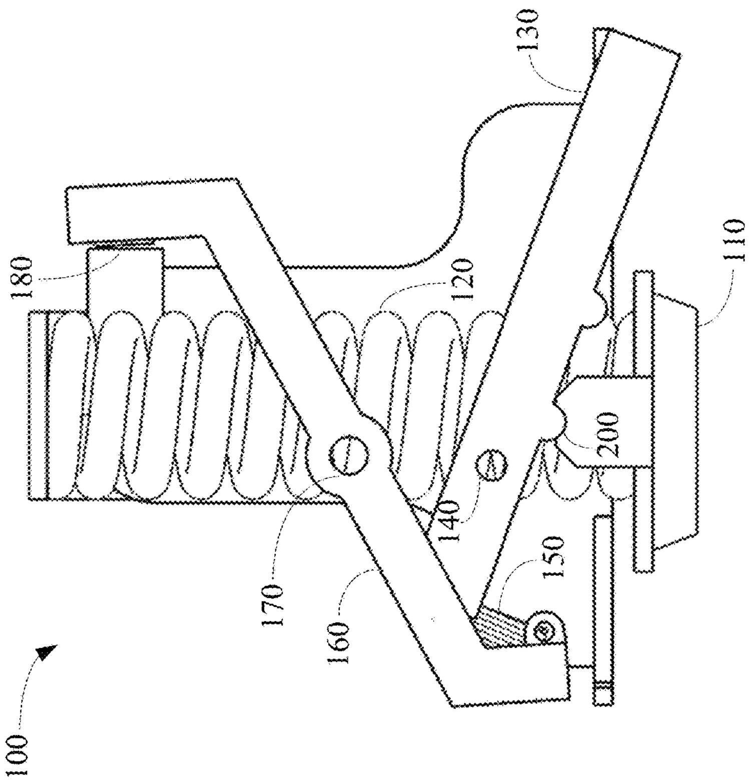
FIG. 3A shows an embodiment of the switch assembly in a quick charge mode when the air compressor is on according to the present disclosure.
Figure 4B:
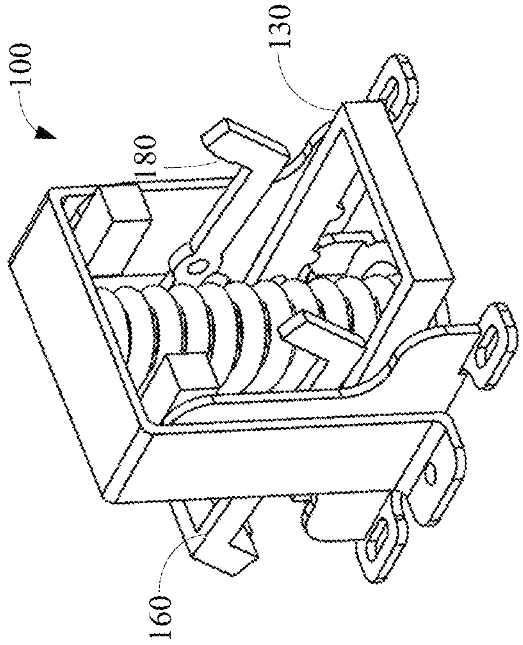
FIG. 4B shows a perspective view of the switch assembly shown in FIG. 4A.
Figure 4A:
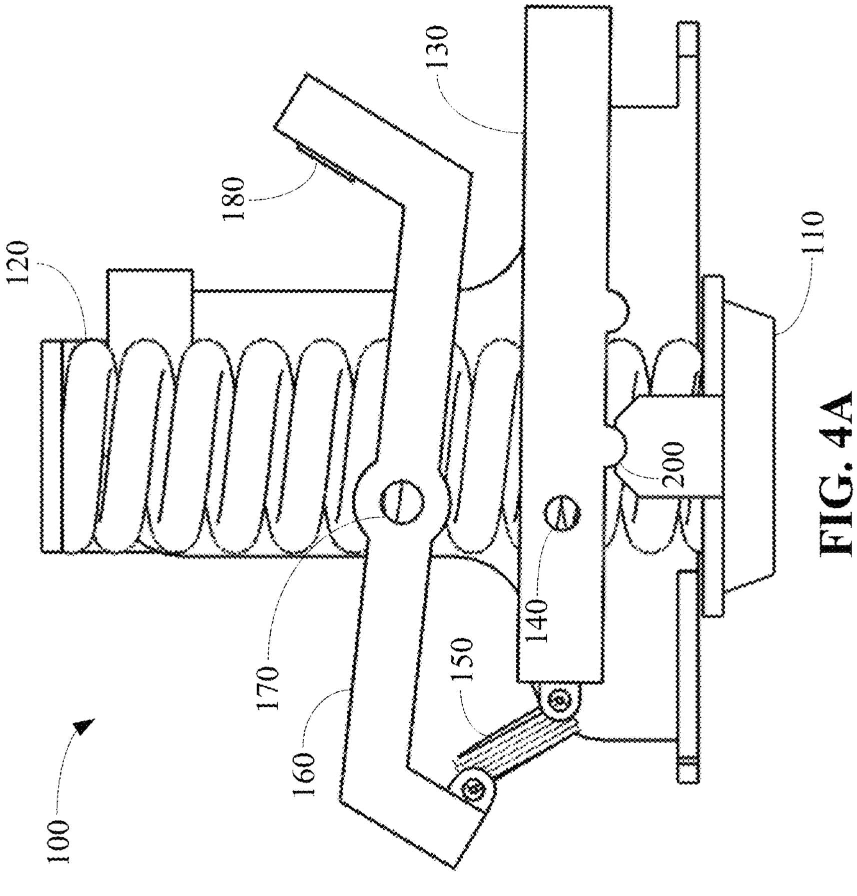
FIG. 4A shows an embodiment of the switch assembly in a quick charge mode when the air compressor is off according to the present disclosure.

FIGS. 3-4 show an embodiment of a configuration of the switch assembly 100 for use during the quick charge mode of operation between a cut-in pressure of 147 psi and a cut-out pressure of 150 psi, for example. The configuration illustrated in FIGS. 3-4 is structured to provide a 2-3 psi range instead of the 15-20 psi range as the configuration illustrated in FIGS. 1-2. A second location is added for the diaphragm connector to act on the first lever 130 to provide a mechanism that is switchable (e.g., user switchable) between standard mode and quick charge mode. The second location, a quick charge pivot point 200, effectively increases the ratio between the diaphragm side of the first lever 130 and the side of the first lever 130 that is connected to the torsion spring 150. The increased ratio translates small changes in diaphragm displacement into larger changes in displacement on the opposite end of the first lever 130. Thus, to the "over-center" mechanism, a 2-3 psi change in FIGS. 3-4 would act just like a 15-20 psi change in FIGS. 1-2, thereby causing a much quicker cut-in or switch-on operation. The opposing spring force acting on the diaphragm would also change as a result of the ratio change on the lever. In some embodiments, the spring preload can be compensated for by utilizing a toggle clamp type mechanism on the spring seat. This is a quick and easy user adjustment between two spring preload settings. Further, if the first lever 130 is designed to be horizontal at the cut-out pressure, then the movement from "normal" to "quick charge" mode does not affect the cut-out pressure setting.

Some embodiments of the present disclosure contemplate using the same pivot modification approach as described above with respect to a two-spring configuration in which the second spring allows for the adjustment of pressure differential between cut-in and cut-out. Other embodiments of the present disclosure contemplate using a toggle clamp approach on one or both springs to achieve the same effect.

Figure 5A:
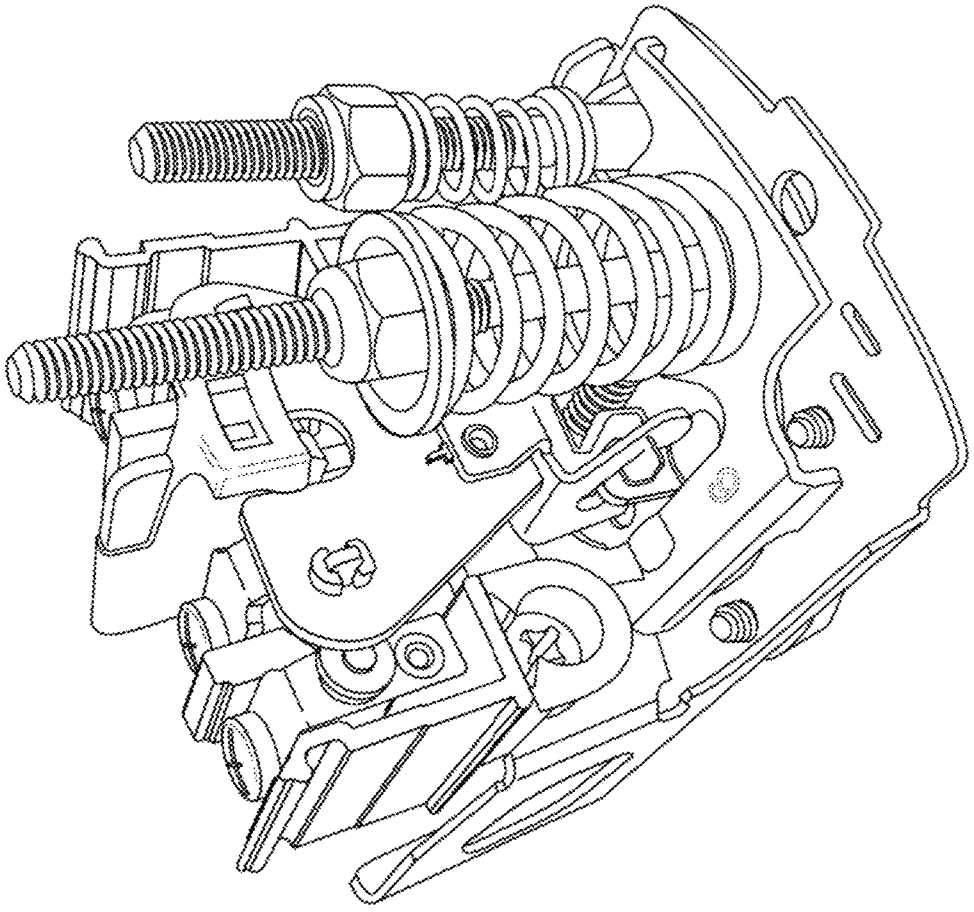
FIG. 5A shows a perspective view of an embodiment of a two-spring assembly according to the present disclosure.
Figure 5D:
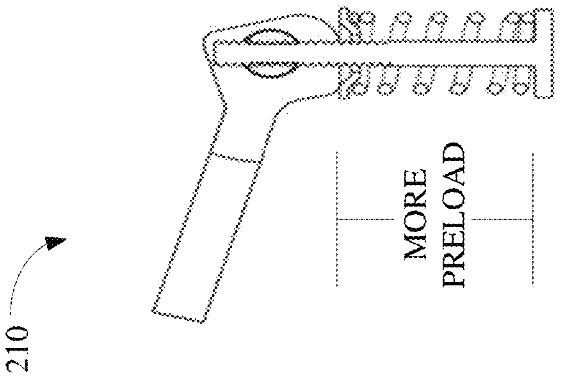
FIG. 5D shows a second state of the toggle clamp assembly shown in FIG. 5A.
Figure 5C:
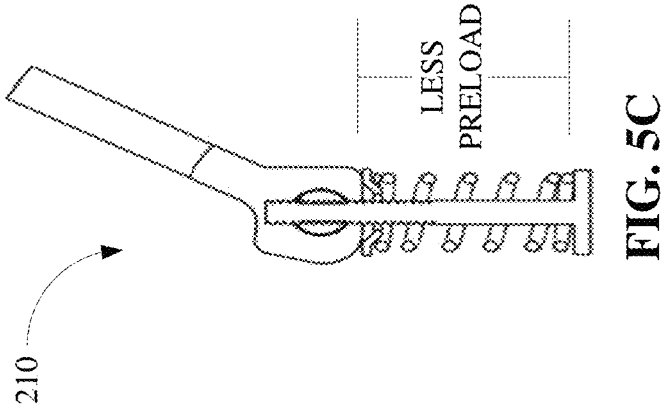
FIG. 5C shows a first state of the toggle clamp assembly shown in FIG. 5A.
Figure 5B:
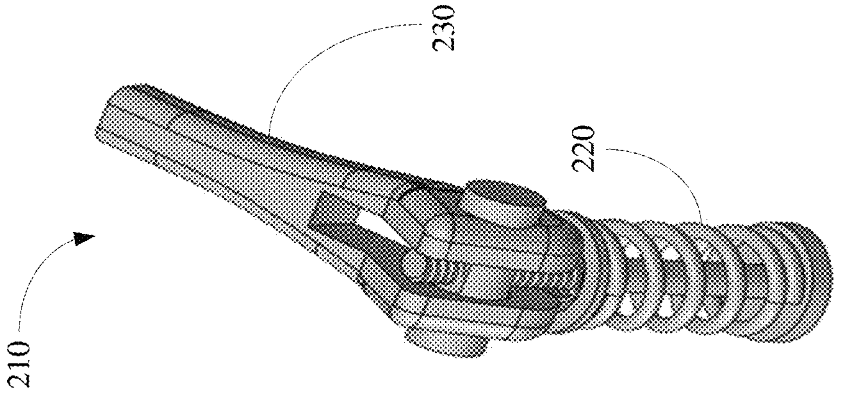
FIG. 5B shows a perspective view of an embodiment of a toggle clamp assembly according to the present disclosure.

FIG. 5A shows an embodiment of a two-spring switch configuration according to the present disclosure. Referring to FIGS. 5B-D, a toggle clamp assembly 210 that includes the one or more springs 220 and a toggle clamp 230 can be used with the two-spring switch configuration to adjust the pressure differential between the cut-in and cut-out pressures. FIGS. 5C-D show two states of the toggle clamp assembly 210 for more or less preload.

Figure 6:
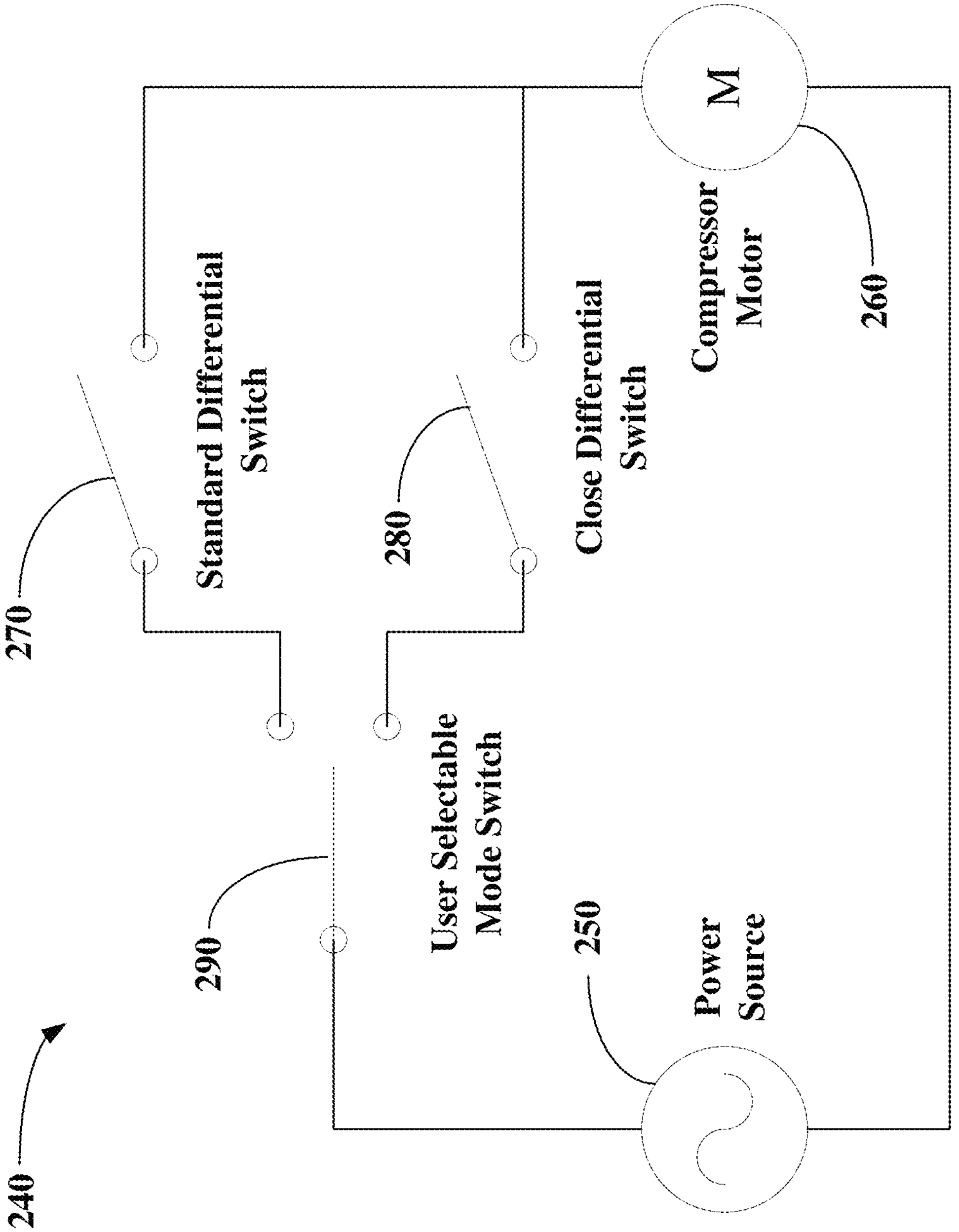
FIG. 6 shows an embodiment of a circuit that includes multiple pressure switches according to the present disclosure.

FIG. 6 shows an embodiment of a circuit that employs multiple switches according to the present disclosure. The circuit 240 includes, for example, a power source 250, a compressor motor 260, a standard differential switch 270, a close differential switch 280, and a user selectable mode switch 290. The switches 270, 280 are pressure switches. The standard differential switch 270 is set to operate at the standard pressure differential (e.g., 15 psi from a cut-in pressure of 135 psi to a cut-out pressure of 150 psi). The close differential switch 280 is set to operate at the close pressure differential (e.g., 3 psi from a cut-in pressure of 147 psi to a cut-out pressure of 150 psi). The user selectable switch 290 can be added and provides the user with the choice of the appropriate pressure switch depending on the application. Some embodiments contemplate that, to enable additional differential modes, more switches can be added and the user selector switch can be increased accordingly in selectable positions.

Some embodiments contemplate various methods and systems by which an electronic device can control the system as described above. For example, a user can select a desired pressure differential using a switch, dial, display, etc. A circuit can then compare the desired maximum pressure and pressure differential to the current tank pressure using, for example, a pressure transducer, pressure switch, etc. and make a decision about turning on or turning off the compressor motor.

Figure 7:
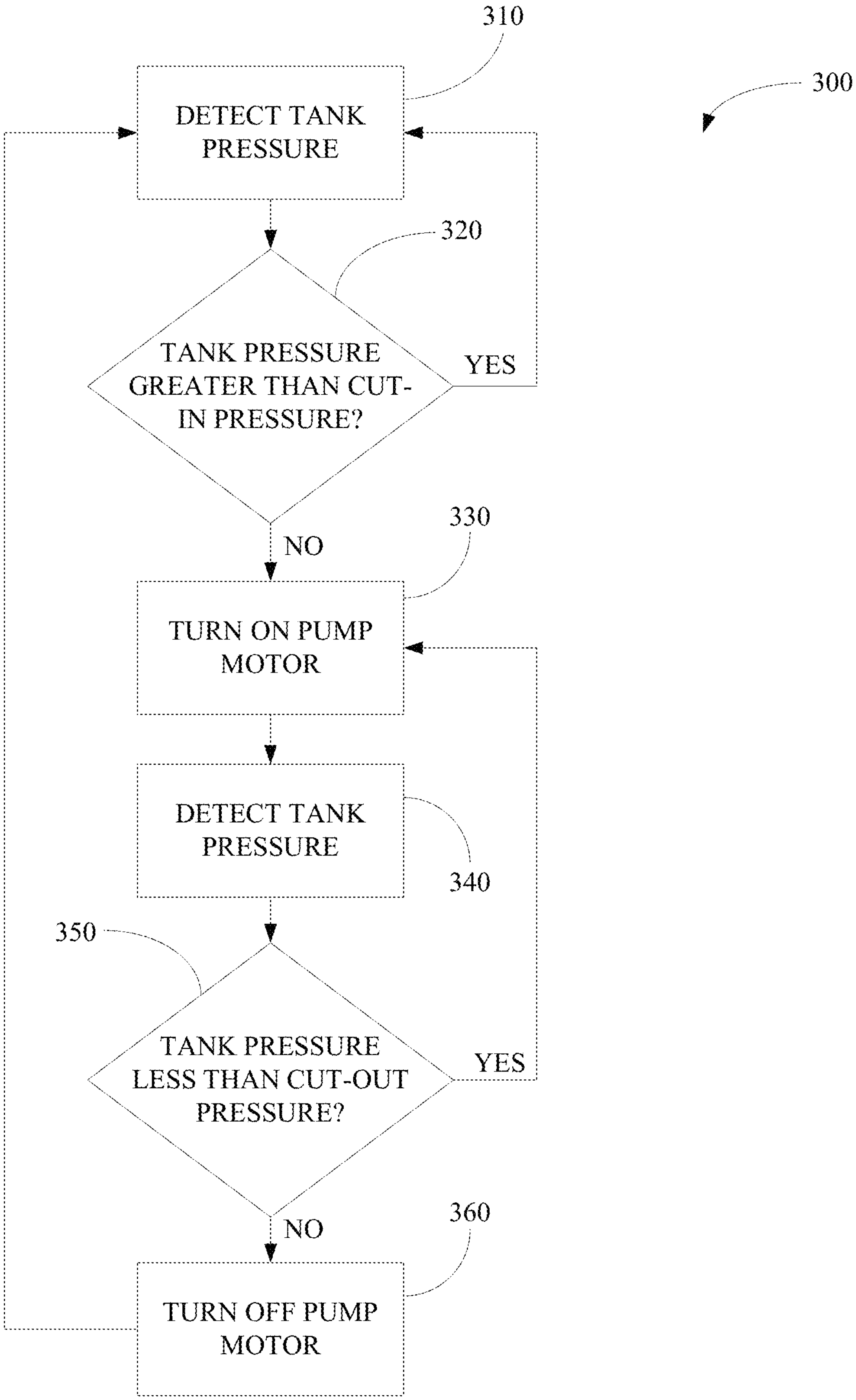
FIG. 7 shows a flow chart of an embodiment of a method for controlling a pump motor according to the present disclosure.

FIG. 7 shows a flow chart of an embodiment of a method for controlling a compressor motor according to the present disclosure. Referring to FIG. 7, the method 300 begins by detecting tank pressure at step 310. In query 320, it is determined whether the tank pressure is greater than or equal to the cut-in pressure. If the tank pressure is greater than or equal to the cut-in pressure, then the method 300 flows back to step 310. If the tank pressure is not greater than or equal to the cut-in pressure, then the pump motor is turned on at step 330. The tank pressure is detected at step 340. In query 350, it is determined whether the tank pressure is less than or equal to the cut-out pressure. If the tank pressure is less than or equal to the cut-out pressure, then the method 300 flows back to step 330. If the tank pressure is not less than or equal to the cut-out pressure, then the pump motor is turned off at step 360 and the method 300 flows back to step 310.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry or device comprises the necessary hardware and code (if any is necessary) or structure to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A switch assembly, comprising:
- a standard pivot point operable to provide a first mode having a first range, when the standard pivot point is manually aligned with a diaphragm connector to a diaphragm assembly; and
- a quick charge pivot point operable to provide a second mode having a second range, when the quick charge pivot point is manually aligned with the diaphragm connector to the diaphragm assembly, wherein:
  - a range is the difference between a cut-out pressure and a cut-in pressure,
  - the second range is smaller than the first range,
  - the second mode adds compressor output over the first mode to extend operating time of a tool that is connected to a compressor,
  - the standard pivot point is located on a side of a first lever at a first location,
  - the quick charge pivot point is located on the side of the first lever at a second location, and
  - a differential cut-in associated with the second mode is faster than a differential cut-in associated with the first mode.

2. The switch assembly according to claim 1, wherein a second lever is connected to the first lever through a torsion spring.

3. The switch assembly according to claim 1, wherein a second lever includes a switch contact at one end that turns the compressor on or off.

4. The switch assembly according to claim 1, wherein the tool has an air consumption rate that exceeds the compressor output of the compressor.

5. The switch assembly according to claim 1, wherein the first range is between approximately 12 psi and 20 psi.

6. The switch assembly according to claim 1, wherein the second range is between approximately 0 psi and 3 psi.

7. The switch assembly according to claim 1, wherein the tool includes one or more of the following: a grinder, a sander, a cutter, a polisher, and a drill.

8. The switch assembly according to claim 1, wherein the first mode is a normal mode, and wherein the second mode provides a compressor output that exceeds the compressor output during the normal mode.

9. The switch assembly according to claim 1, wherein the compressor is turned off when a tank pressure exceeds the first cut-out pressure in the first mode and when the tank pressure exceeds the second cut-out pressure in the second mode.

10. The switch assembly according to claim 1, wherein the compressor is turned on when a tank pressure is less than the first cut-in pressure in the first mode and when the tank pressure is less than the second cut-in pressure in the second mode.

11. A switch assembly, comprising:
- a diaphragm connector;
- a diaphragm assembly operably coupled to the diaphragm assembly; and
- a first lever comprising a standard pivot point and a quick charge pivot point at two different locations on the side of the first lever, wherein:
  - the standard pivot point is operable, when manually aligned via the diaphragm connector, to provide a first mode having a first range,
  - the quick charge pivot point is operable, when manually aligned via the diaphragm connector, to provide a second mode having a second range,
  - a range is the difference between a cut-out pressure and a cut-in pressure,
  - the second range is smaller than the first range,
  - the second mode adds compressor output over the first mode to extend operating time of a tool that is connected to a compressor, and
  - a differential cut-in associated with the second mode is faster than a differential cut-in associated with the first mode.

12. The switch assembly according to claim 11, comprising a second lever connected to the first lever through a torsion spring.

13. The switch assembly according to claim 11, comprising a second lever with a switch contact at one end that turns the compressor on or off.

14. The switch assembly according to claim 11, wherein the tool has an air consumption rate that exceeds the compressor output of the compressor.

15. The switch assembly according to claim 11, wherein the first range is between approximately 13 psi and 30 psi.

16. The switch assembly according to claim 11, wherein the second range is between approximately 0 psi and 3 psi.

17. The switch assembly according to claim 11, wherein the tool includes one or more of the following: a grinder, a sander, a cutter, a polisher, and a drill.

18. The switch assembly according to claim 11, wherein the first mode is a normal mode, and wherein the second mode provides a compressor output that exceeds the compressor output during the normal mode.

19. The switch assembly according to claim 11, wherein the compressor is turned off when a tank pressure exceeds the first cut-out pressure in the first mode and when the tank pressure exceeds the second cut-out pressure in the second mode.

20. The switch assembly according to claim 11, wherein the compressor is turned on when a tank pressure is less than the first cut-in pressure in the first mode and when the tank pressure is less than the second cut-in pressure in the second mode.

* * * * *